US007836004B2

(12) United States Patent
Roth et al.

(10) Patent No.: US 7,836,004 B2
(45) Date of Patent: Nov. 16, 2010

(54) USING DATA MINING ALGORITHMS INCLUDING ASSOCIATION RULES AND TREE CLASSIFICATIONS TO DISCOVER DATA RULES

(75) Inventors: Mary Ann Roth, San Jose, CA (US); Blayne Harold Chard, San Jose, CA (US); Yannick Saillet, Stuttgart (DE); Harald Clyde Smith, Groveland, MA (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 11/609,307

(22) Filed: Dec. 11, 2006

(65) Prior Publication Data

US 2008/0140602 A1 Jun. 12, 2008

(51) Int. Cl.
*G06N 5/02* (2006.01)
(52) U.S. Cl. .................... 706/47; 706/59; 707/776; 707/797; 707/E17.044
(58) Field of Classification Search ............. 706/47, 706/59; 707/776, 797, E17.044
See application file for complete search history.

(56) References Cited

U.S. PATENT DOCUMENTS

| 5,615,341 | A | 3/1997 | Agrawal et al. |
| 5,794,209 | A | 8/1998 | Agrawal et al. |
| 5,813,002 | A | 9/1998 | Agrawal et al. |
| 6,078,918 | A * | 6/2000 | Allen et al. ............... 707/6 |
| 6,182,070 | B1 | 1/2001 | Megiddo et al. |
| 6,272,478 | B1 | 8/2001 | Obata et al. |
| 6,278,997 | B1 | 8/2001 | Agrawal et al. |
| 6,836,773 | B2 | 12/2004 | Tamayo et al. |
| 6,850,947 | B1 | 2/2005 | Chung et al. |
| 6,877,012 | B2 * | 4/2005 | Ashida et al. ............... 707/102 |
| 6,941,303 | B2 | 9/2005 | Perrizo |

(Continued)

FOREIGN PATENT DOCUMENTS

| CN | 1435781 A | 8/2003 |
| CN | 1145901 C | 4/2004 |

OTHER PUBLICATIONS

Janta-Polczynski, M. and E. Roventa, "Fuzzy Measures for Data Quality", 18th International Conference of the North American Fuzzy Information Processing Society, Jul. 1999, pp. 398-402.

(Continued)

*Primary Examiner*—Donald Sparks
*Assistant Examiner*—Mai T Tran
(74) *Attorney, Agent, or Firm*—David Victor; Konrad Raynes & Victor LLP (57) ABSTRACT

Provided are a method, system, and article of manufacture for using a data mining algorithm to discover data rules. A data set including multiple records is processed to generate data rules for the data set. Each record has a record format including a plurality of fields and each rule provides a predicted condition for one field based on at least one predictor condition in at least one other field. The generated data rules are provided to a user interface to enable a user to edit the generated data rules. The data rules are stored in a rule repository to be available to use to validate data sets having the record format.

33 Claims, 9 Drawing Sheets

U.S. PATENT DOCUMENTS

| | | | |
|---|---|---|---|
| 6,954,756 | B2 | 10/2005 | Arning et al. |
| 6,965,888 | B1 | 11/2005 | Cesare et al. |
| 7,266,537 | B2 | 9/2007 | Jacobsen et al. |
| 2003/0191667 | A1* | 10/2003 | Fitzgerald et al. ............... 705/2 |
| 2004/0093559 | A1 | 5/2004 | Amaru et al. |
| 2004/0189708 | A1 | 9/2004 | Larcheveque et al. |
| 2004/0226002 | A1 | 11/2004 | Larcheveque et al. |
| 2005/0060313 | A1 | 3/2005 | Naimat et al. |
| 2005/0066240 | A1 | 3/2005 | Sykes et al. |
| 2005/0066263 | A1 | 3/2005 | Baugher |
| 2005/0108631 | A1 | 5/2005 | Amorin et al. |
| 2005/0144552 | A1 | 6/2005 | Kalthoff et al. |
| 2005/0182739 | A1 | 8/2005 | Dasu et al. |
| 2006/0136461 | A1 | 6/2006 | Lee et al. |
| 2006/0167579 | A1 | 7/2006 | Fujii et al. |
| 2006/0253435 | A1 | 11/2006 | Nishizawa et al. |
| 2006/0274760 | A1 | 12/2006 | Loher |
| 2007/0073688 | A1* | 3/2007 | Fry ............................... 707/6 |

OTHER PUBLICATIONS

Marchetti, C., M. Mecella, M. Scannapieco, and A. Virgillito, "Enabling Data Quality Notification in Cooperative Information Systems through a Web-Service Based Architecture", Proceedings of the Fourth International Conference on Web Information Systems Engineering, 2003, 4pp.

Morgan, Reish, Stone, Swearingen, "Implementation of Comprehensive Qualification and Validation of Entry Fields", TDB vol. 38, No. 2, Feb. 1995, pp. 317-318.

Seekamp, C. and K. Britton, "Dynamic Generation of Rules from Properties to Improve Rule Processing Performance", RD No. 429, Jan. 2000, pp. 172.

Shipway and Tricker, "Data Validation and Correction by Context", TDB Sep. 1971, pp. 1132-1137.

U.S. Appl. No. 11/779,251, filed Jul. 17, 2007, entitled "Managing Validation Models and Rules to Apply to Data Sets", invented by Labrie, J.J., G. Agrawal, M.A. Roth, & Y. Saillet, 34 pp.

U.S. Appl. No. 11/769,639, filed Jun. 27, 2007, entitled "Using a Data Mining Algorithm to Generate Format Rules Used to Validate Data Sets", invented by Labrie, J.J., D. Meeks, M.A. Roth, & Y. Saillet, 30 pp.

U.S. Appl. No. 11/769,634, filed Jun. 27, 2007, entitled "Using a Data Mining Algorithm to Generate Rules Used to Validate a Selected Region of a Predicted Column", invented by Roth, M.A. & Y. Saillet, 42 pp.

Wang, R.Y., H.B. Kon, and S.E. Madnick, "Data Quality Requirements Analysis and Modeling", Proceedings of the Ninth International Conference on Data Engineering, 1999, pp. 670-677.

Wikipedia, "N-gram", [online], [retrieved on May 13, 2007]. Retrieved from the Internet at <URL: http://en.wikipedia.org/wiki/N-gram>, 3 pp.

Data Mining Group, "Association Rules", PMML 3.1, [online], [retrieved on Nov. 1, 2006], retrieved from the Internet at <URL: http://www.dmg.org/v3-1/AssociationRules.html>, 7 pp.

Data Mining Group, "Trees", PMML 3.1, [online], [retrieved on Nov. 1, 2006], retrieved from the Internet at <URL: http://www.dmg.org/v3-1/TreeModel.html>, 18 pp.

Han, E., G. Karypis, & V. Kumar, "Scalable Parallel Data Mining for Association Rules", Proceedings of the 1997 ACM SIGMOD International Conference on Management of Data, 1997, pp. 277-288.

Hipp, J., U. Guntzer, & U. Grimmer, "Data Quality Mining- Making A Virtue of Necessity", Proceedings of the 6th ACM SIGMOND Workshop on Research Issues in Data Mining and Knowledge Discovery, 2001, pp. 52-57.

Korn, F., A. Labrinidis, Y. Kotidis, & C. Faloutsos, "Quantifiable Data Mining Using Ratio Rules", The VLDB Journal, 2000, pp. 254-256.

Marcus, A., J.I. Maletic, & K. Lin, "Ordinal Association Rules for Error Identification in Data Sets", Proceedings of the Tenth International Conference on Information and Knowledge Management, 2001, pp. 589-591.

Muller, H., U. Leser, & J. Freytag, "Mining for Patterns in Contradictory Data", Proceedings of the 2004 International Workshop on Information Quality in Information Systems, 2004, pp. 51-58.

Pudi, V., "Data Mining- Association Rules", [online], [retrieved on Nov. 1, 2006], retrieved from the Internet at <URL: http://www.iiit.ac.in/~vikram/mining.html>, 3 pp.

Wikipedia, "Decision Tree", [online], [retrieved on Nov. 1, 2006], retrieved from the Internet at <URL: http://en.wikipedia.org/w/index.php?title=Decision_tree&printable=yes>, 7 pp.

Knobbe, A.J., "Multi-Relational Data Mining", Nov. 22, 2004, 130 pp.

Shekhar, S., B. Hamidzadeh, A. Kohli, & M. Coyle, "Learning Transformation Rules for Semantic Query Optimization: A Data-Driven Approach", IEEE Transactions on Knowledge and Data Engineering, Vol. 5, Iss. 6, Dec. 1993, pp. 1-29.

U.S. Appl. No. 12/165,549, filed Jun. 30, 2008, entitled "Discovering Transformations Applied to a Source Table to Generate a Target Table", invented by Bittner, T., H. Kache, M.A. Roth, and Y. Saillet, 49 pp.

Wikipedia, "Apriori Algorithm", [online], Updated May 22, 2006, [retrieved on Jun. 20, 2008], retrieved from the Internet at <URL: http://en.wikipedia.org/w/index.php?title=apriori_algorithm&printible=yes>, 3 pp.

Williams, J., "Tools for Traveling Data", [online], Jun. 1997, [retrieved on Mar. 25, 2008], retrieved from the Internet at <URL: http://www.dbmsmag.com/9706d16.html>, 10 pp.

English Abstract for CN1435781A, published Aug. 13, 2003, 1 p.

English Abstract for CN1145901C, published Apr. 14, 2004, 1 p.

Jingyi, D., "Survey of Association Rule Data Mining", © 1994-2009 China Academic Journal Electronic Publishing House, Total 2 pp. [with English Abstract on page 1].

Nesvizhskii, A.I., F.F. Roos, J. Grossman, M. Vogelzang, J.S. Eddes, W. Gruissem, S. Baginsky, and R. Aebersold, "Dynamic Spectrum Quality Assessment and Iterative Computational Analysis of Shotgun Protemic Data", Molecular & Cellular Proteomics, vol. 5, © 2006, The American Society for Biochemistry and Molecular Biology, Inc., pp. 652-670.

\* cited by examiner

| ID | MARITAL_STATUS | GENDER | PROFESSION | AGE | NBR_YEARS_CLI | SAVINGS_ACCOUNT | ONLINE_ACCESS | JOINED_ACCOUNT | BANK_CARD | AVERAGE_BALANCE |
|---|---|---|---|---|---|---|---|---|---|---|
| 0501583 | Married | M | Craftsmen | 33 | 8 | NO | NO | NO | NO | -66 |
| 1263033 | Single | M | Craftsmen | 47 | 9 | NO | NO | NO | NO | 1356 |
| 0283696 | Married | F | Employee | 54 | 18 | NO | NO | YES | NO | 25068 |
| 0046069 | Single | M | Craftsmen | 43 | 11 | NO | NO | NO | NO | 12505 |
| 0141327 | Married | M | Employee | 38 | 7 | YES | YES | NO | YES | 5036 |
| 0096669 | Married | M | Worker | 52 | 15 | NO | NO | YES | NO | 53 |
| 0216430 | Married | M | Pensioner | 72 | 10 | YES | NO | YES | NO | 50329 |
| 0414751 | Single | M | Worker | 29 | 11 | NO | YES | NO | YES | 4367 |
| 1273275 | Married | M | Pensioner | 68 | 23 | NO | NO | YES | NO | 235 |
| 0814533 | Married | M | Worker | 46 | 22 | NO | NO | YES | NO | 6784 |
| 0698337 | Married | M | Farmer | 37 | 16 | NO | NO | NO | YES | 10564 |
| ... | ... | ... | ... | ... | ... | ... | ... | ... | ... | ... |

FIG. 5

| ID | MARITAL_STATUS | GENDER | PROFESSION | AGE | NBR_YEARS_CLI | SAVINGS_ACCOUNT | ONLINE_ACCESS | JOINED_ACCOUNT | BANK_CARD | AVERAGE_BALANCE |
|---|---|---|---|---|---|---|---|---|---|---|
| 0501583 | Married | M | Craftsmen | [30-40] | [5-10] | NO | NO | NO | NO | [-5000 – 0] |
| 1263033 | Single | M | Craftsmen | [40-50] | [5-10] | NO | NO | NO | NO | [0 – 5000] |
| 0283696 | Married | F | Employee | [50-60] | [15-20] | NO | NO | YES | NO | [25000-30000] |
| 0046069 | Single | M | Craftsmen | [40-50] | [10-15] | NO | NO | NO | NO | [10000-15000] |
| 0141327 | Married | M | Employee | [30-40] | [5-10] | YES | YES | NO | YES | [5000–10000] |
| 0096669 | Married | M | Worker | [50-60] | [15-20] | NO | NO | YES | NO | [0 – 5000] |
| 0216430 | Married | M | Pensioner | [70-80] | [10-15] | YES | NO | YES | NO | [50000-55000] |
| 0414751 | Single | M | Worker | [20-30] | [10-15] | NO | YES | NO | YES | [0 – 5000] |
| 1273275 | Married | M | Pensioner | [60-70] | [20-25] | NO | NO | YES | NO | [0 – 5000] |
| 0814533 | Married | M | Worker | [40-50] | [20-25] | NO | NO | YES | NO | [5000–10000] |
| 0698337 | Married | M | Farmer | [30-40] | [15-20] | NO | NO | NO | YES | [10000-15000] |
| ... | ... | ... | ... | ... | ... | ... | ... | ... | ... | ... |

FIG. 6

| TRANSACTION_ID | ITEM | TRANSACTION_ID | ITEM |
|---|---|---|---|
| 0501583 | MARITAL_STATUS=Married | 0283696 | NBR_YEARS_CLI=[15-20] |
| 0501583 | GENDER=M | 0283696 | SAVINGS_ACCOUNT=NO |
| 0501583 | PROFESSION=Craftsmen | 0283696 | ONLINE_ACCESS=NO |
| 0501583 | AGE=[30-40] | 0283696 | JOINED_ACCOUNT=YES |
| 0501583 | NBR_YEARS_CLI=[5-10] | 0283696 | BANKCARD=NO |
| 0501583 | SAVINGS_ACCOUNT=NO | 0283696 | AVERAGE_BALANCE=[25000-30000] |
| 0501583 | ONLINE_ACCESS=NO | 0046069 | MARITAL_STATUS=Single |
| 0501583 | JOINED_ACCOUNT=NO | 0046069 | GENDER=M |
| 0501583 | BANKCARD=NO | 0046069 | PROFESSION=Craftsmen |
| 0501583 | AVERAGE_BALANCE=[-5000 – 0] | 0046069 | AGE=[40-50] |
| 1263033 | MARITAL_STATUS=Single | 0046069 | NBR_YEARS_CLI=[10-15] |
| 1263033 | GENDER=M | 0046069 | SAVINGS_ACCOUNT=NO |
| 1263033 | PROFESSION=Craftsmen | 0046069 | ONLINE_ACCESS=NO |
| 1263033 | AGE=[40-50] | 0046069 | JOINED_ACCOUNT=NO |
| 1263033 | NBR_YEARS_CLI=[5-10] | 0046069 | BANKCARD=NO |
| 1263033 | SAVINGS_ACCOUNT=NO | 0046069 | AVERAGE_BALANCE=[10000-15000] |
| 1263033 | ONLINE_ACCESS=NO | 0141327 | MARITAL_STATUS=Married |
| 1263033 | JOINED_ACCOUNT=NO | 0141327 | GENDER=M |
| 1263033 | BANKCARD=NO | 0141327 | PROFESSION=Employee |
| 1263033 | AVERAGE_BALANCE=[0 – 5000] | 0141327 | AGE=[30-40] |
| 0283696 | MARITAL_STATUS=Married | 0141327 | NBR_YEARS_CLI=[5-10] |
| 0283696 | GENDER=F | 0141327 | SAVINGS_ACCOUNT=YES |
| 0283696 | PROFESSION=Employee | 0141327 | ONLINE_ACCESS=YES |
| 0283696 | AGE=[50-60] | ... | |

| Name | Rule | CreateOn | DataRule ID | Support | Confidence | Description | Status |
|---|---|---|---|---|---|---|---|
| Data Rule 01 | if NBR_YEARS_CLI=26 then ONLINE_ACCESS=NO | 06.27.2006 | ID 01 | 0.04% | 0.92% | | inactive |
| Data Rule 02 | if AVERAGE_BALANCE=0 then ONLINE_ACCESS=NO | 06.27.2006 | ID 02 | 0.09% | 0.94% | | inactive |
| Data Rule 03 | if AVERAGE_BALANCE=0 then JOINED_ACCOUNTS=NO | 06.27.2006 | ID 03 | 0.09% | 0.9% | | inactive |
| Data Rule 04 | if MARITAL_STATUS=widowed then ONLINE_ACCESS=NO | 06.27.2006 | ID 04 | 0.07% | 0.92% | | inactive |
| Data Rule 05 | if JOINED_ACCOUNTS=YES then MARITAL_STATUS=married | 06.27.2006 | ID 05 | 0.47% | 0.91% | | inactive |
| Data Rule 06 | if MARITAL_STATUS=single then JOINED_ACCOUNTS=NO | 06.27.2006 | ID 06 | 0.23% | 0.94% | | inactive |
| Data Rule 07 | if MARITAL_STATUS=child then PROFESSION=inactive | 06.27.2006 | ID 07 | 0.07% | 0.99% | | inactive |
| Data Rule 08 | if MARITAL_STATUS=child then ONLINE_ACCESS=NO | 06.27.2006 | ID 08 | 0.07% | 0.97% | | inactive |
| Data Rule 09 | if MARITAL_STATUS=child then JOINED_ACCOUNTS=NO | 06.27.2006 | ID 09 | 0.07% | 0.99% | | inactive |
| Data Rule 10 | if BANKCARD=NO then ONLINE_ACCESS=NO | 06.27.2006 | ID 10 | 0.46% | 0.93% | | inactive |
| Data Rule 11 | if PROFESSION=pensioner then ONLINE_ACCESS=NO | 06.27.2006 | ID 11 | 0.16% | 0.93% | | inactive |

USING DATA MINING ALGORITHMS INCLUDING ASSOCIATION RULES AND TREE CLASSIFICATIONS TO DISCOVER DATA RULES

BACKGROUND OF THE INVENTION

1. Field

The present invention relates to a method, system, and article of manufacture for using a data mining algorithm to discover data rules.

2. Description of the Related Art

Data records in a database may be processed by a rule evaluation engine applying data rules to determine data records that have column or field values that deviate from the values that are expected by the rules. In the current art, the user manually codes data rules by first analyzing the data visually or using a profiling tool to obtain an understanding of the pattern of a well-formed record. Next a user builds logical expressions that define a set of rules to describe the normal characteristics of records in the set. These rules are then repeatedly executed against data sets to flag records that fail the conditions specified by the data rules and report on trends in failure rates over time.

A user may use a rule editor user interface to create new data rules or modify existing rules. Rules may be expressed in a rule language, such as BASIC or the Structured Query Language (SQL). The user may then save rules in a rule repository in the rule language or in a common rule format. The user may then select rules from the rule repository and a data set of records to provide to the rule evaluation engine to execute the selected rules against the selected data records to validate the data, capture the results and display the results to the user.

Developing data rules can require a significant amount of user time, effort and skill to analyze patterns in data, especially for large data sets having millions of records with hundreds of columns. For this reason, a data user typically does not develop and deploy rules until after bad data records result in recognizable business problems or setbacks. Because of this, data rules are often defined reactively after a problem is experienced and may be tailored to address the last experienced problem instead of future problems that may arise with the data records.

There is a need in the art to provide improved techniques for generating and using data rules.

SUMMARY

Provided are a method, system, and article of manufacture for using a data mining algorithm to discover data rules. A data set including multiple records is processed to generate data rules for the data set. Each record has a record format including a plurality of fields and each rule provides a predicted condition for one field based on at least one predictor condition in at least one other field. The generated data rules are provided to a user interface to enable a user to edit the generated data rules. The data rules are stored in a rule repository to be available to use to validate data sets having the record format.

In a further embodiment, the generated data rules are applied to a data set to identify records that do not satisfy the rules and the identified records are presented to the user interface for the user to review when editing the generated data rules.

In a further embodiment, user modifications to the generated data rules are received from the user interface and a user approved set of data rules is generated including the user modifications to the generated data rules, wherein the user approved set of data rules is stored in the rule repository.

In a further embodiment, processing the data set comprises applying a data mining technique to generate the data rules, wherein the data mining technique is a member of the set of data mining techniques including association rules and tree classifications.

In a further embodiment, processing the data set to generate the data rules comprises: applying a first data mining algorithm to the data set to generate a first set of data rules; applying a second data mining algorithm to the data set to generate a second set of data rules; and wherein providing the generated data rules to the user interface comprises providing the first and second sets of data rules to the user interface for the user to review.

In a further embodiment, rules in the first and second sets of data rules that are redundant are identified and information is presented in the user interface to the user indicating redundant data rules to enable the user to modify the rules to remove redundant data rules.

In a further embodiment, the first data mining algorithm uses association rules to determine the data rules and the second data mining algorithm uses a tree classification data mining algorithm.

In a further embodiment, the first and second sets of data rules provide rules in different rule language formats. The first and second sets of data rules are converted to a common rule language format to store in the repository.

In a further embodiment, the data rules provided to the user interface and stored in the repository satisfy a defined confidence level indicating a minimum probability at which at least one predictor condition for the at least one field infers the predicted condition for one field.

In a further embodiment, the data rules provided to the user interface and the repository satisfy at least one of a minimum support level, minimum confidence level, minimum lift level, and maximum rule length and are entered via the user interface.

In a further embodiment, processing the data set further comprises discretizing numerical fields to convert the numerical fields to ranges of values, wherein the data rules are generated from the discretized numerical fields.

In a further embodiment, the data set has multiple columns and generating the data rules comprises: generating a tree classification model for each column comprising nodes, wherein each node provides predictive conditions that produce a predicted condition in the column; and determining, for each tree classification model, nodes inferring data rules comprising predicative and predicted conditions that satisfy support and confidence levels.

BRIEF DESCRIPTION OF THE DRAWINGS

FIG. 5 illustrates an example of a data set.

FIGS. 6 and 7 illustrate examples of preprocessed versions of the data set of FIG. 5.

DETAILED DESCRIPTION

Figure 1:
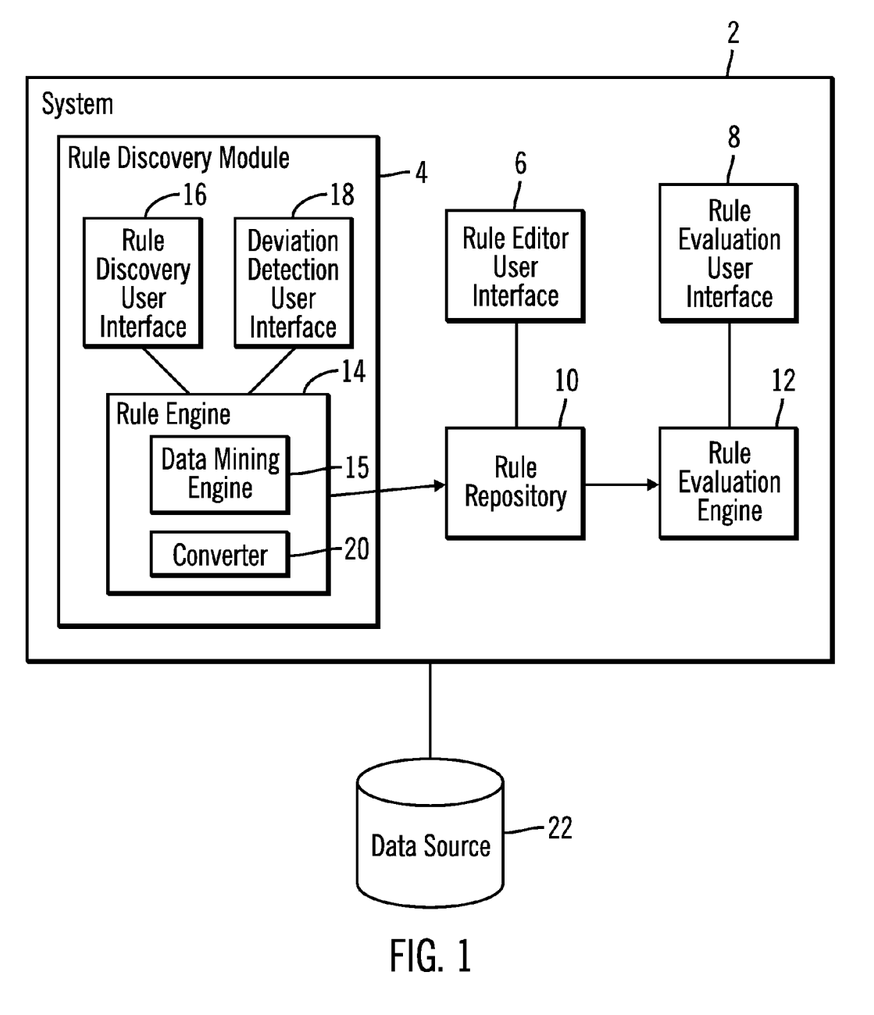
FIG. 1 illustrates an embodiment of a computing environment.

FIG. 1 illustrates a computing environment in which embodiments may be implemented. A system 2 includes program components comprising a rule discovery module 4, a rule editor user interface 6, a rule evaluation user interface 8, a rule repository 10, and a rule evaluation engine 12. The rule discovery module 4 includes a rule engine 14 including a data mining engine 15 and a converter 20, a rule discovery user interface 16, and a deviation detection user interface 18. The program components may comprise software components that are loaded into a memory in the system 2 and executed by a processor of the system 2. The system is further coupled to a data source 22 that includes database tables and records, where the records may have one or more fields. The data source 22 may be implemented in a computer readable medium, such as a storage device.

The data mining engine 15 may comprise data mining engines known and available in the art. The rule engine 14 may include one or more data mining engines 15 implementing one or more data mining functions/algorithms that analyze data to produce data mining models, which may be in a known format such as the Predictive Model Markup Language (PMML). The converter 20 analyzes the data mining models from the data mining engine 15 (which are not appropriate by default to solve data validation problems), extract the data validation rules, and write the data rules in a common format that can be reused by the rule evaluation engine 12.

The rule discovery module 4 is invoked to automatically generate data rules that validate the values of data records in a table in the data source 22, e.g., IF [bank account=joint], THEN [marital status=married]. The data rules indicate one or more conditions for one or more predictive fields that infer within a defined confidence and support level predicted conditions of one predicted field. A predicted condition for a predicted field may specify a value, a range of values or specific values for a predicted field, e.g., age <18, salary >= 40000, profession is in {a, b, c}, or other condition types known in the data mining art. A condition may comprise a condition other than a field, such as a root node of a tree model, such as for condition "IF [TRUE] THEN . . . ", meaning that the root node is always true. These rules may then be applied to data sets to determine field values that deviate from the rules and thus may be erroneous.

The rule engine 14 applies one or more data mining engines 15 implementing data mining algorithms to a data set of records to determine data rules for the data. The data mining algorithms determine rules that specify a predicted condition for fields based on one or more predictor conditions in other fields. The converter 20 may further convert data rules in the model language of the algorithm, such as the Predictive Model Markup Language (PMML), into a common rule model language, such as a data validation language. The rule repository 10 may store rules in a common rule format, even if the rules were generated in different formats from different rule algorithms.

The rule discovery user interface 16 provides a user interface to a user that allows the user to specify parameters for the rule engine 14, such as a minimum confidence level, minimum support level, minimum lift, and maximum rule length for generated rules and one or more data mining algorithms for the rule engine 14 to use. A confidence level indicates a minimum probability at which one or more predictor conditions from predictive fields infer the predicted condition for the predicted field, i.e., the certainty in the records that are analyzed by the rule engine 10 that one or more fields predict a condition in another field. A support level indicates a minimum number or percentage of records of the analyzed records that must satisfy the determined data rule. A minimum lift value may be of the form lift (A->C)=confidence(A->C)/support(C), providing a measure of interest in the rule. Lift values greater than 1.0 indicate that transactions containing A tend to contain C more often than transactions that do not contain A.

The deviation detection user interface 18 presents to the user those records in the analyzed data set used to produce the data rules that deviate from, i.e., do not satisfy, the rules. This allows the user to review and consider the extent to which the data rules are correctly identifying erroneous data or incorrectly identifying correct records as deviant.

The rule discovery module 4 thus automatically determines data rules for a data set with a confidence metric that measures how strongly the rules are supported by the data sets.

The rule engine 14 provides the generated data rules to a rule repository 10. A rule editor user interface 6 allows the user to edit, modify and delete the generated data rules. For instance, the user may inspect data records that deviate from the generated data rules in the deviation detection user interface 18 and then edit the generated rules in the rule editor user interface 6 based on an analysis of the deviant records and logic of the generated data rules.

The user may use the rule evaluation user interface 8 to select a rule or set of rules from the rule repository to execute against data sets in the data source 22 having records to which the selected rules apply. The selected rules are loaded from the rule repository 10 to a rule evaluation engine 12 which executes the rules against selected tables and records from the data source 22, capturing results and analysis which are displayed to the user via the rule evaluation user interface 8. Upon the rule evaluation engine 12 identifying deviant records, the evaluation engine 12 may apply automatic corrections to the data or present deviant records to the user to review and edit.

The user interfaces 6, 8, and 18 may be implemented in a graphical user interface or through a command line interface in which the user enters textual commands to control the rule engine 14, rule repository 10 and rule evaluation engine 12.

The data mining engine 15 may utilize a data mining association rules algorithm to generate data rules from a data set of records. An example of such an algorithm is the APRIORI algorithm or the algorithm described in U.S. Pat. No. 5,615, 341. These algorithms may produce association rules models as defined in the PMML standard. An association rules model contains rules that express an association between items occurring together in a same transaction. For instance, the association algorithm may receive as an input two columns, one for the transaction identifiers (IDs) and one for the items. The association algorithm then searches for all relationships between the items, making no assumptions on the content of the analyzed items, treating them only as strings. In certain embodiments, the association algorithm may also detect the relationship between the conditions, e.g., values, of columns of a table. The data mining engine 15 may then assume that each row in the table is a transaction and generate one item "COL=val" for each column, which is then passed to the association algorithm. The data rules generated by data mining association rule algorithms may follow the form of—if one or more fields have certain predictor conditions, then a predicted field has a predicted condition or consequence. The data mining engine 15 using a data mining association rules algorithm may generate all data rules that satisfy the specified confidence, support level, and lift.

One of the data mining engines 15 may use a data mining tree classification algorithm to generate data rules from the data set. The tree classification algorithm may build for one target column a model which contains a decision tree to predict the condition of this target column from the condition of the other columns. The association rules model may capture rules predicting the conditions of different columns, whereas a tree classification model may only predict the conditions of one single column. In such embodiments, the data mining engine 15 may compute one tree classification model for each column in the data to detect rules validating all columns. Each node in the tree represents a classification, containing information about the confidence of each possible condition/value. The condition having the highest confidence may be considered as the predicted condition. The final selected rules may comprise the rules generated by nodes that have a confidence and support values that satisfy the confidence and support level requirements for the algorithm.

The rules engine 14 may include one or more data mining engines 15, where each data mining engine 15 may implement one or more data mining/algorithms, e.g., association and/or tree classification data mining algorithms to generate data rules. The data mining engines 15 may implement data mining algorithms known in the art to provide data rules to infer the conditions of predicted columns with conditions from one or more predictive columns.

In certain embodiments, the rule discovery module 4 and rule editor user interface 6 may be on a separate system than the system that includes the rule evaluation engine 12 and rule evaluation user interface 8 to use the generated rules. Further, any of the components of the rule discovery module 4 or other components shown in the system 2 may be implemented on one system or in a distributed computing environment.

Figure 2:
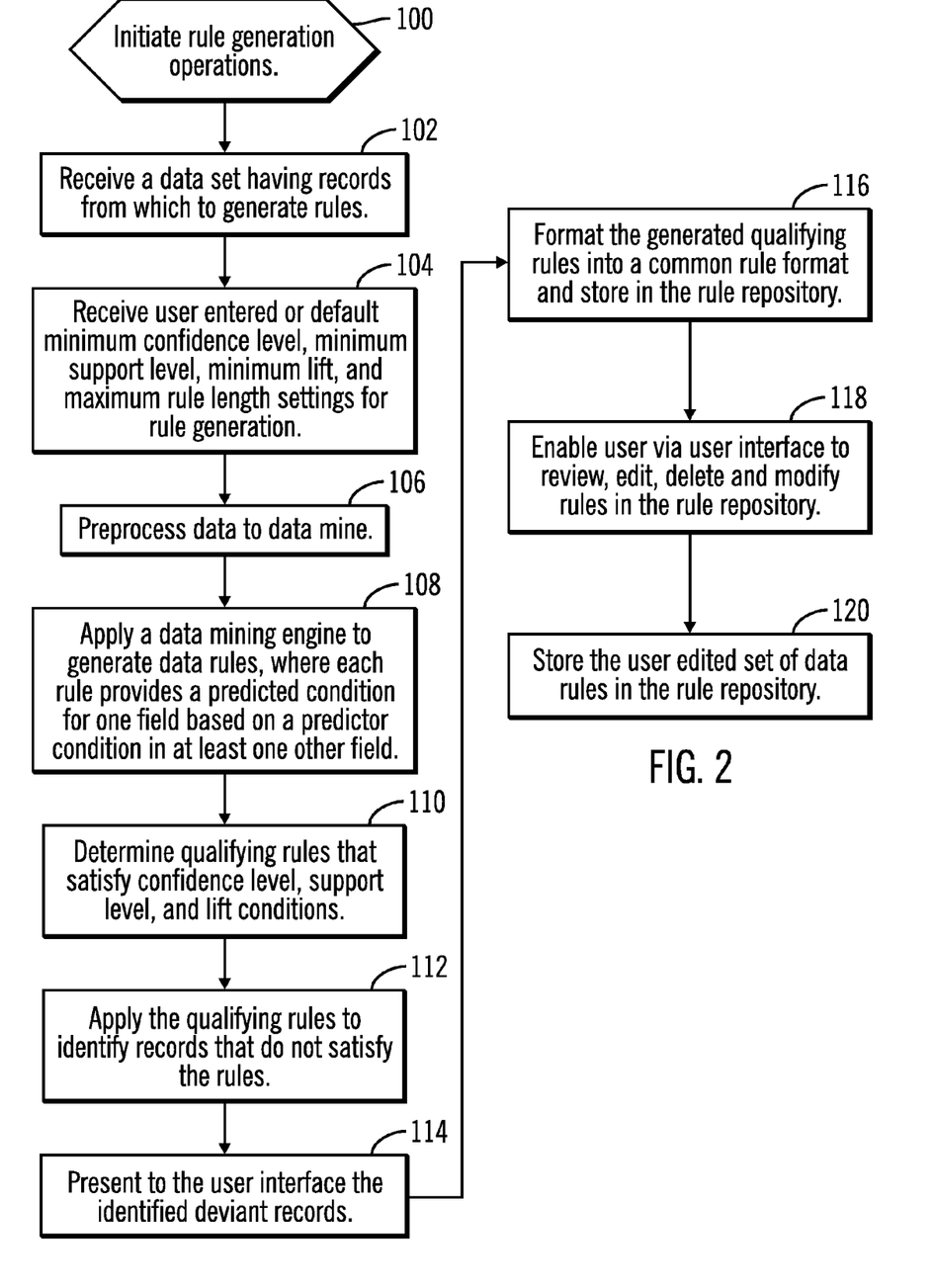
FIGS. 2 and 4 illustrate embodiments of operations performed to generate data rules.

FIG. 2 illustrates an embodiment of operations performed by the components of the system 2 to generate data rules from a data set of records in the data source 22. Upon initiating (at block 100) rule generation operations, the rule engine 14 receives (at blocks 102 and 104) a data set having records from which to generate rules and a user entered or default minimum confidence level, minimum support level, minimum lift, and maximum rule length settings for rule generation. The rule engine 14 may receive the data set and confidence levels, support levels, and minimum lift from the rule discovery user interface 16. The rule engine 14 may then preprocess (at block 106) the data before the data mining engine 15 extracts the data validation rules. Preprocessing the data may involve discretization, which converts values in numeric columns to a range of values for processing. Preprocessing may further involve pivoting the data records in the received data set if the data mining engine 15 used requires pivoted data. For instance, if the data mining engine 15 comprises an association rules model, then the preprocessing operation may involve pivoting the table in a two columns format (transaction ID, item) where each item is "COL=value" and where the numeric values are discretized. If the data mining engine 15 uses a tree classification algorithm, then each numerical target column is discretized before a tree classification model is computed on it. All other numerical columns may remain unchanged.

The data mining engine 15 then applies (at block 108) a data mining algorithm to generate the data rules, where each rule provides a predicted condition for one predicted field based on one or more predictor conditions in at least one other predictor field. The rules may be in the PMML model format.

The data mining engine 15 may further determine (at block 110) qualifying rules that satisfy the specified confidence and support level conditions. The data mining engine 15 may further apply (at block 112) the qualifying rules to identify records, from the data set or a compatible data set that was processed to generate the data rules, that do not satisfy the rules, i.e., deviate from the generated rules. The deviation detection user interface 18 may then present (at block 114) the determined deviant records to the user to review. This allows the user to analyze whether the rules are appropriately identifying deviant records and to determine rules that may be needed.

The converter 20 may then format (at block 116) the generated qualifying rules, into a common rule format and store the formatted rules in the rule repository 10. For instance, the converter 20 may read the rules, which may be in a rule model format such as PMML, obtained by mining, extract the information contained in them and convert that to the model or language used to define the data validation rules, i.e., the common rule format. The rule editor user interface 6 enables (at block 118) the user to review, edit, delete and modify rules in the rule repository 10. The user may further use the rule editor user interface 6 to store (at block 120) the user edited set of data rules in the rule repository 10.

Figure 3:
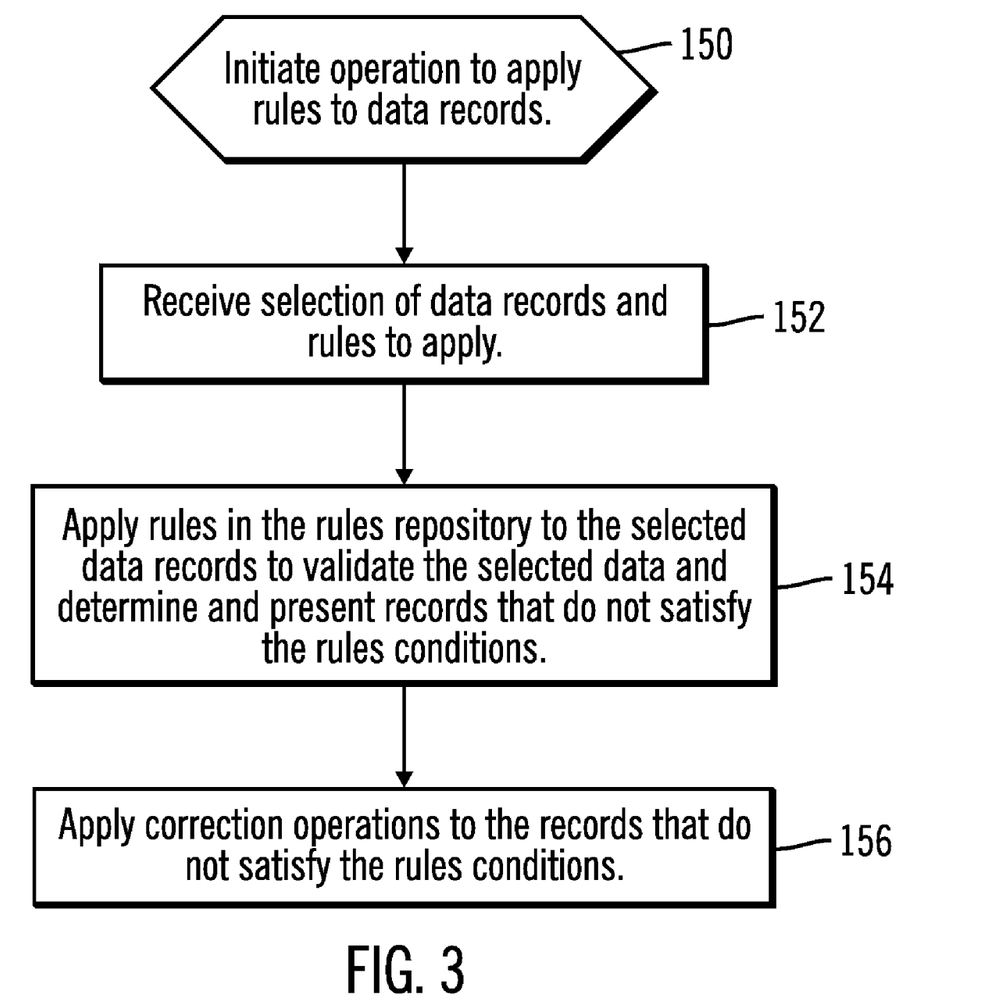
FIG. 3 illustrates an embodiment of operations to apply rules to data records.

FIG. 3 illustrates an embodiment of operations performed by the system 2 components to apply rules to data sets from the data source 22. Upon initiating (at block 150) evaluation operations, the rule evaluation engine 12 receives (at block 152) a selection of data records from the data source 22 and rules to apply via the rule evaluation user interface 8. Alternatively, the rule evaluation engine 12 may determine and use those rules in the rules repository 10 that apply to the selected data records. The rule evaluation engine 12 then applies (at block 154) the selected or determined rules in the rules repository 10 to the selected data records to validate the selected data and determine and present records to the user via the rule evaluation user interface 8 that do not satisfy the rule conditions. The rule evaluation engine 12 may then apply (at block 156) correction operations to the records that do not satisfy the rules conditions. The corrections may be entered by the user via the rule evaluation user interface 8. Alternatively, the rule evaluation engine 12 may automatically determine and apply corrections to the data records.

Figure 4:
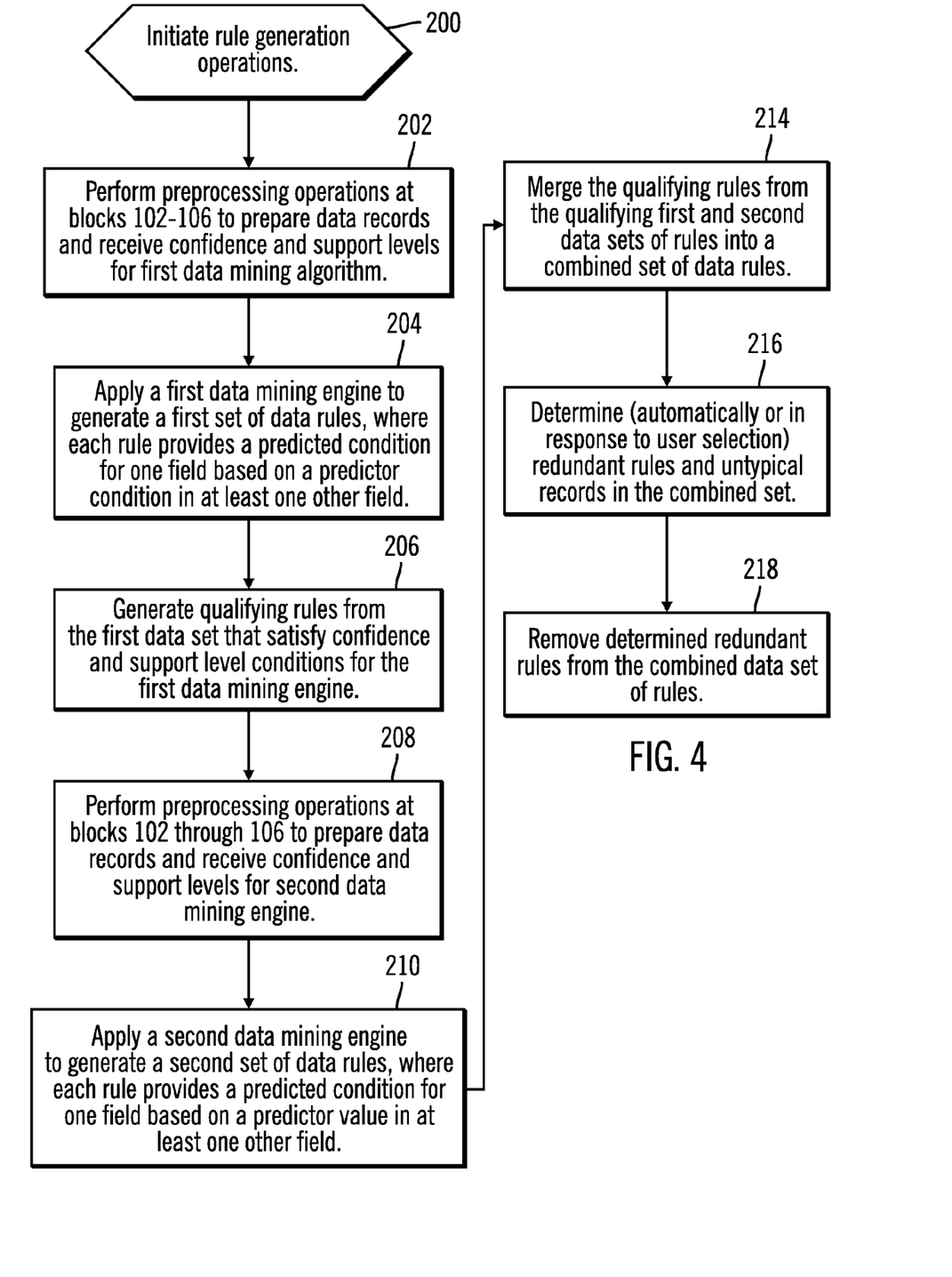

FIG. 4 illustrates an additional embodiment to generate data rules using multiple data mining algorithms. Upon initiating rule generation operations (at block 200), the preprocessing operations at blocks 102 through 106 (FIG. 2) may be performed to prepare data records and receive confidence and support levels for a first data mining algorithm. The rule engine 14 applies (at block 204) a first data mining engine 15 to generate a first set of data rules, where each rule provides a predicted condition for one field based on a predictor condition in at least one other field. The first data mining engine 15 generates (at block 206) qualifying rules from the first data set that satisfy the confidence and support level conditions for the first data engine 15 algorithm.

For instance, if the data mining engine 15 implements an association rules algorithm, then the data mining engine 15 may build an association model with filter conditions satisfying the received support and confidence levels and then parse the rules model and construct a data rule for each association rule in the model. If the data mining engine 15 implements the tree classification algorithm, then the engine 15 may build a tree classification model for each predicted column. The tree classification model represents a decision tree to predict the value of a target column. The path to each node provides predicates or conditions for one or more predictor columns that produce a predicted condition (or value) in the predicted column. Predicates may comprise conditions involving fields, compound predicates, simple predicates, set predicates, a TRUE or a FALSE, etc. For the nodes in a classification model, the data mining engine 15 may determine those nodes whose predication infers the column condition that satisfies the specified confidence and support levels and then builds a data rule from the decision path leading to the node satisfying the confidence and support levels. Thus, the data rule is of the form: IF <decision path to node>, which specifies conditions for other columns, THEN <a predicted condition for the predicted column>. These node filtering and data rule operations are performed for each node for column for which each tree classification model is generated.

After applying the first data engine 15, the rule engine 14 may perform (at block 208) preprocessing operations at blocks 102 through 106 to prepare data records and receive confidence and support levels for a second data engine 15. The preprocessing operations performed at blocks 202 and 208 may differ depending on the requirements of the data mining engine 15 that is used. For instance, the association rules algorithm may require a conversion of numeric values into a range of values, i.e., discretization. The tree classification algorithm may require the discretization of the target column if it is numeric and all other numeric columns remain unchanged. The association rules algorithm may also require that the data records be pivoted. The rule engine 14 applies the second data mining engine 15 to generate (at block 210) a second set of data rules, where each rule provides a predicted condition for one field based on a predictor condition in at least one other field. The second set of rules may satisfy the specified minimum support, confidence, lift, and maximum rule length. The rule engine 14 then merges (at block 214) the qualifying rules from the qualifying first and second data sets of rules into a combined set of data rules. In further embodiments, the rule engine 14 may use more than two data mining algorithms to generate data rules.

The rule engine 14 may determine (at block 216) automatically or in response to user selection redundant rules or untypical records generated by the different algorithms in the combined set of data rules. For instance, the deviation detection user interface 18 may display information on untypical records to allow the user to consider these untypical records as hints to conjure new rules that may be entered manually. The rule editor user interface 16 may remove (at block 218) redundant rules from the combined data set of rules either automatically by the rule engine 14 or in response to user selection via the user interface 16.

Following are some examples of how the data mining rules may be applied. FIG. 5 provides an example of a data set (containing demographic data for a bank's customers) from which to generate data rules. Each customer is uniquely identified by an ID, and for each customer, the bank tracks a customer's marital status, gender, profession, age, number of years a client of the bank, whether the client has a savings account, uses on-line access, has a joint account, has a bankcard, and, finally, the average balance of his account.

FIG. 6 illustrates an example of the data set resulting from the first step of the preprocessing operation to discretize the numeric values in categorical intervals for the association data mining algorithm. In this example, the ID field supplies the unique ID required for the transaction ID, and each row in the data set can be grouped into a transaction whose ID is given by the row's ID. The next step is to pivot the dataset if the data mining engine requires such a format.

Figure 7:
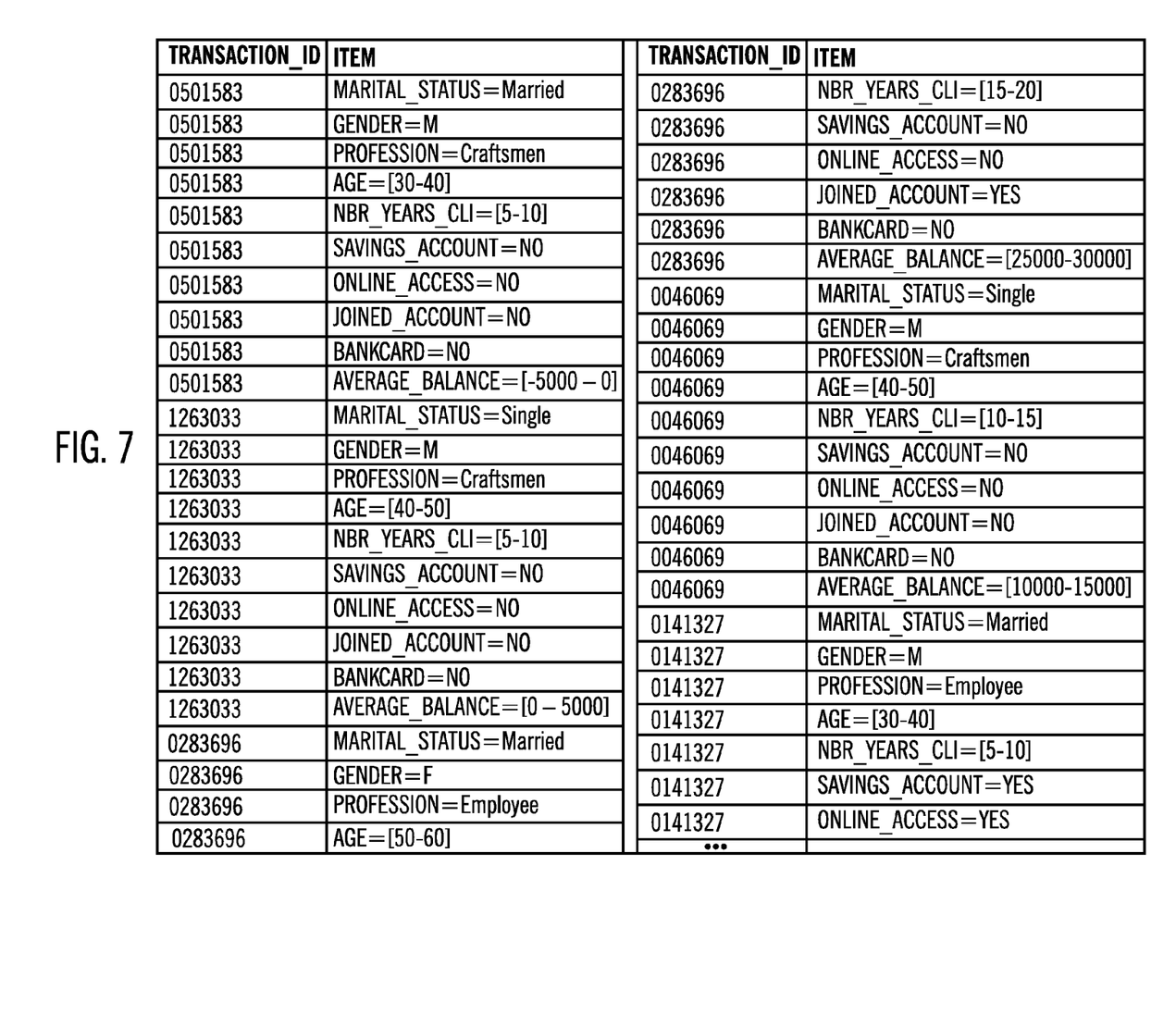

FIG. 7 shows the dataset in this pivoted form as part of the preprocessing for the association data mining algorithm. A row in the original dataset is represented in the pivoted form by as many rows as the number of columns in the original dataset.

Next, following the preprocessing operation at block 106 resulting in the data shown in FIG. 7, the data mining engine 15 may perform the operation at block 108 to compute an association model for the dataset that conforms to the length, support, and confidence parameters input by the user.

Figure 8:
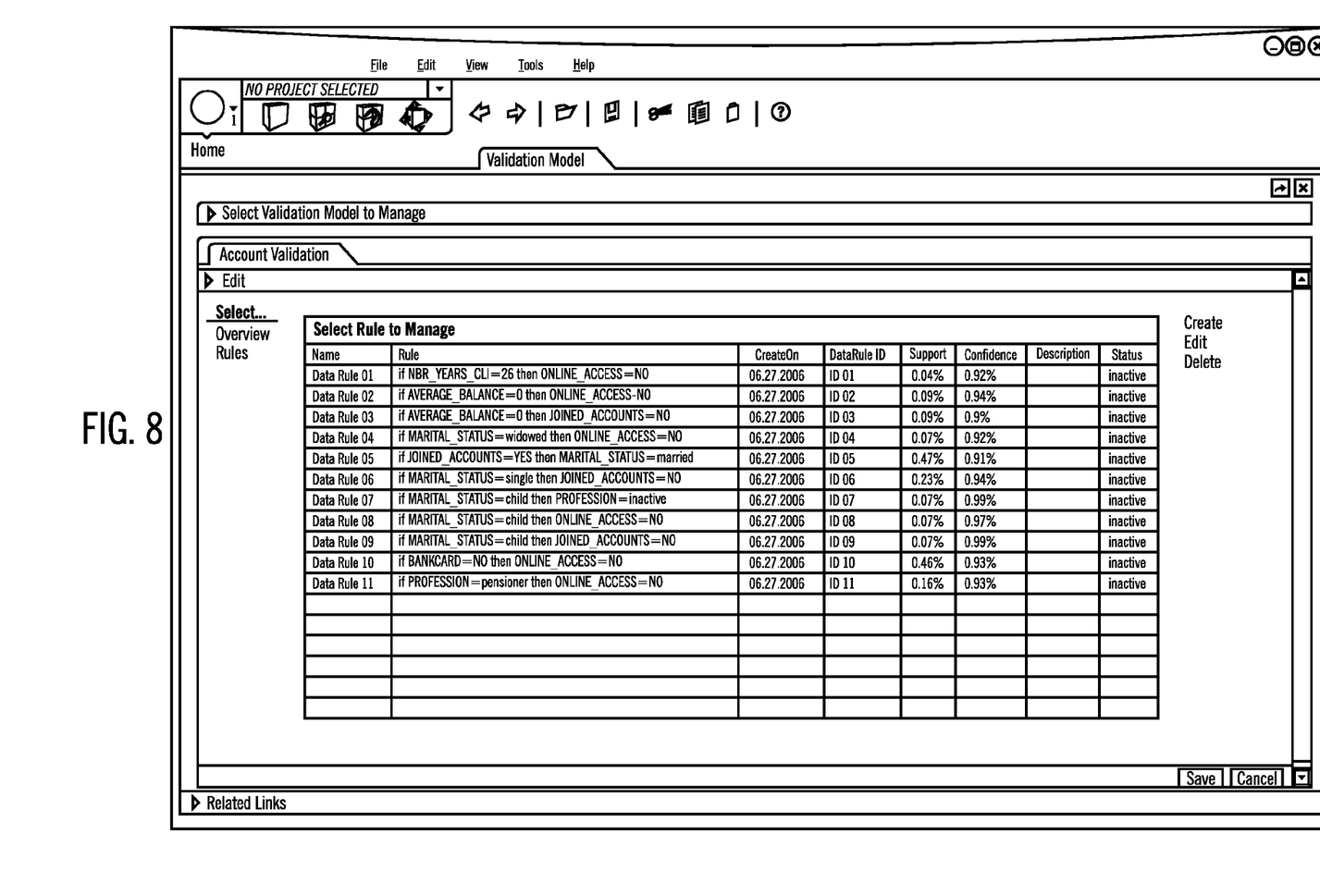
FIG. 8 illustrates an example of data rules generated from the data set of FIGS. 5, 6, and 7.

FIG. 8 illustrates an example of the associative rules generated at block 108 using values of maximum length=2, minimum support=2% and minimum confidence=90%. These rules shown in FIG. 8 are generated by the data mining engine 15 based on patterns in the data. Not all generated rules may be relevant for data quality purposes, but such rules offer a starting point for a user to define data quality rules. For example, data rule 07 represents a general principle, i.e., if the account holder is a child, a profession should not be specified. On the other hand, data rules 02 and 03 suggest that with a $0 account balance, the account is not held jointly and on-line access is not used. Such relationships may be less relevant for data quality. Further, the support and confidence values offer new metrics that the user can use to measure the strength of the data rule with respect to the data set and as a gauge to determine whether the rule has merit. For example, in 99% of the cases where MARITAL_STATUS is 'child', PROFESSION is 'inactive', indicating that a data record in which that is not true is likely to be a deviant record that should examined more closely.

The rules may be stored in the repository 10 and displayed back to the user via the user interfaces 6, 8.

Figure 9:
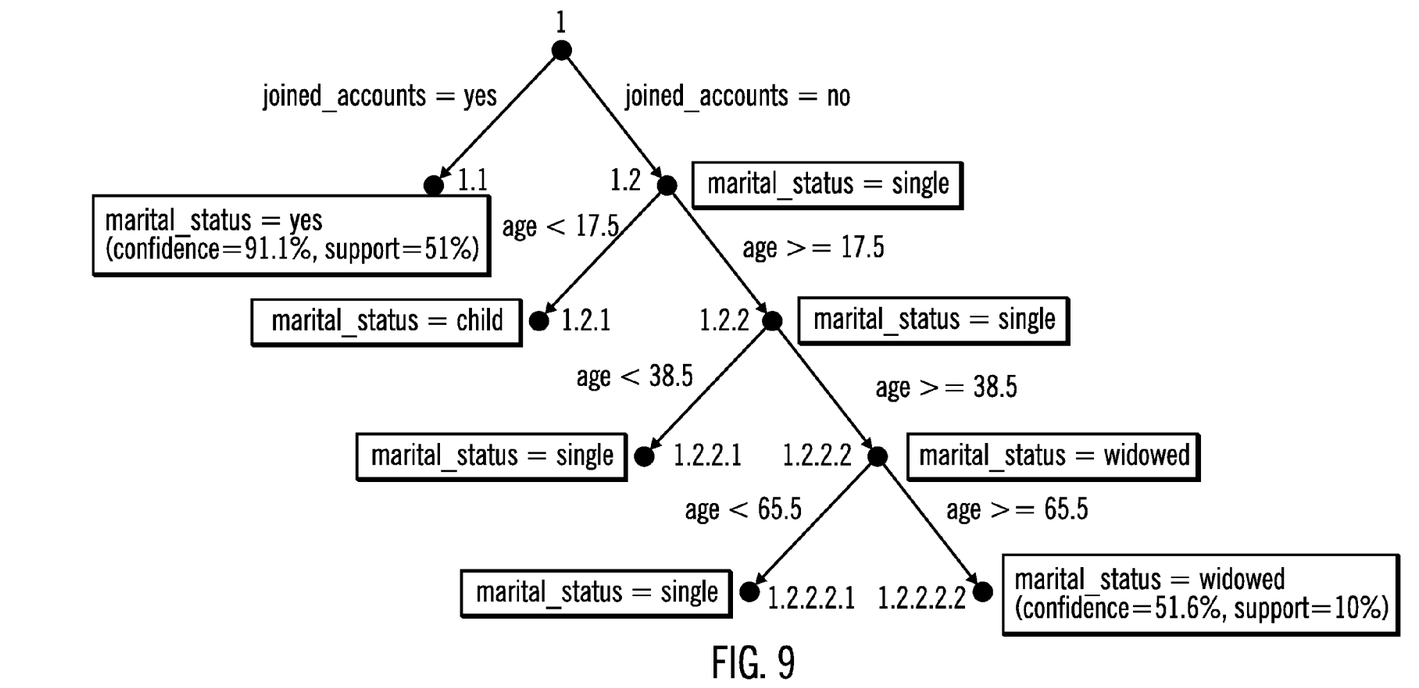
FIG. 9 illustrates an example of a classification tree.

FIG. 9 illustrates an example of a tree classification model produced by the data mining engine 15 using a tree classification algorithm. The model in FIG. 9 seeks to predict the value of the column marital_status. Each node in the tree represents a potential value given the decision tree shown on the branches. For example, node 1.1 indicates that the most probable value for marital_status is "yes" if joined_accounts has a value of "yes" with an 91.1% confidence and support of 51%. Node 1.2.2.2.2 indicates that the most probable value of marital_status is "widowed" if joined_accounts has a value of "no" and age is greater than or equal to 65.5 with 51.6% confidence and 10% support. Confidence and support values for other nodes are omitted for brevity.

Figure 10:
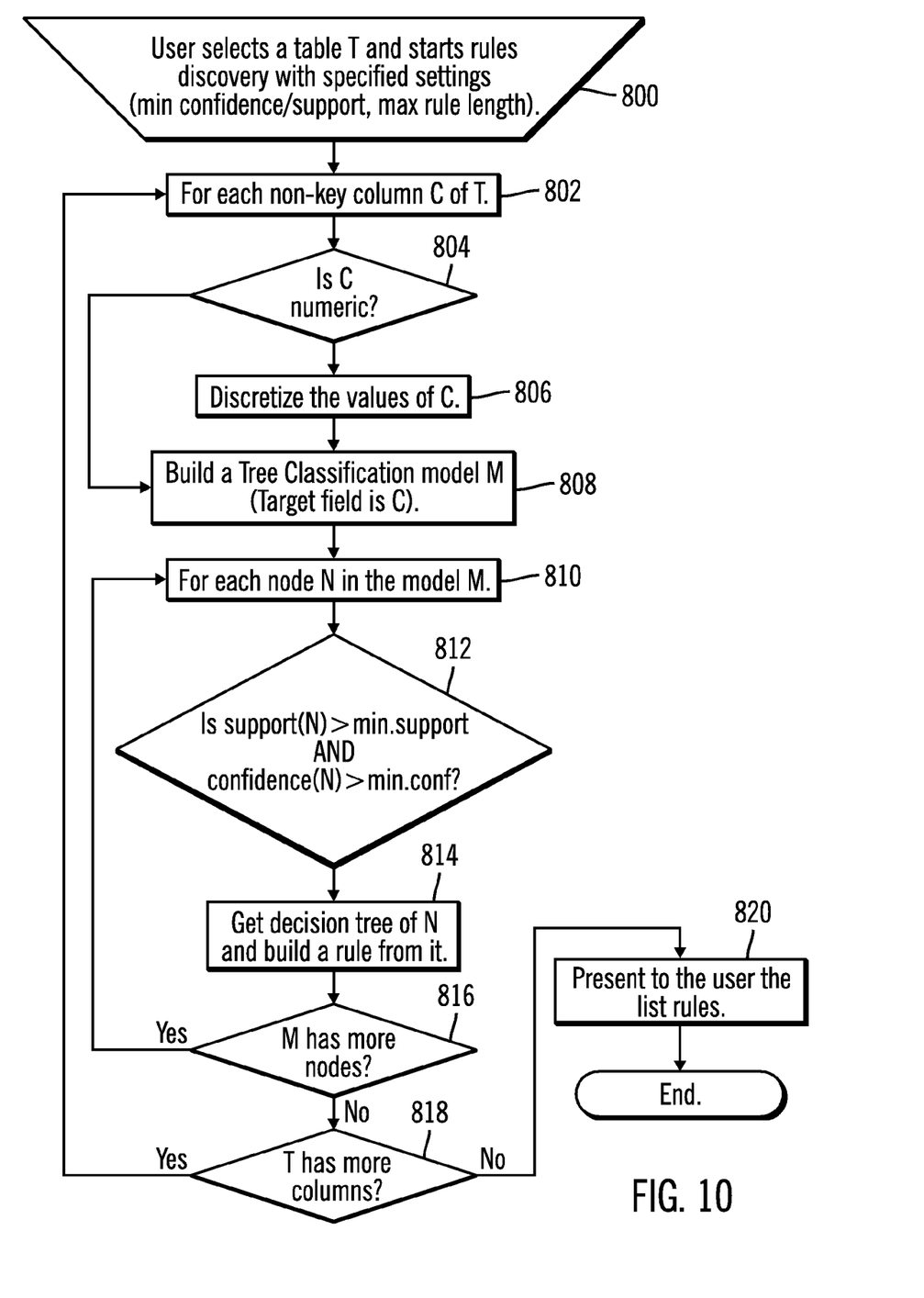
FIG. 10 illustrates an embodiment of how tree classification models are used to discover data rules.

FIG. 10 illustrates how the rule engine 14 may use a tree classification algorithm of a data mining engine 15 to discover and generate data rules. The data mining engine 15 computes a data mining model and the rule engine 14 generates the data rules from the data mining models by analyzing the decision path associated with each node of the model. The decision path of a tree node plays the same role as the <body> in an association rule model, and it can be mapped to the <conditions> portion of the data rule. The predicted condition, e.g., value, of the column corresponds to the <head> in the association rule, and therefore it can be mapped to the <consequences> portion of a data rule. The user selects the data set for which data rules are to be discovered and generated. As with the association rules approach, he can also specify values for confidence, support and length. The rule engine 14 may perform (at block 802) the operations at blocks 804 through 818 for each column that can contain non-unique values. The column will form the basis of a <target column=value> condition in the <head> clause. At blocks 802 through 806, the data mining engine 15 discretizes the target column for each computed model if it is numeric. During each model computation, there is only one column discretized at a time. When the next model is computed, the target column of the first model is not discretized. Discretization of the target columns that are numeric converts the numeric columns into categoric intervals, e.g., age=25 is replaced by the interval 20<=age<=30. The data mining engine 15 builds (at block 808) a tree classification model for the column, such as the model shown in FIG. 9. The data mining engine 15 then performs (at block 810) the operations at blocks 812 through 818 for each node in the classification model. If (at block 812) the confidence and the size of the node is greater than or equal to the specified minimum confidence/support, then the data mining engine 15 builds a data rule from the decision path leading to the node of the form if <decision path> then <target column=predicted value>. If (at block 816) the model has another node, control returns to 810. If the model does not have another node and if (at block 818) the input data set has another column with non-unique values, then control returns to block 802 to generate a tree classification model for the next column. After generating all the rules and models, the data mining engine 15 may present (at block 820) the discovered data rules to the user in the native data rule format, which may be displayed in the rule editor user interface 6.

Figure 11:
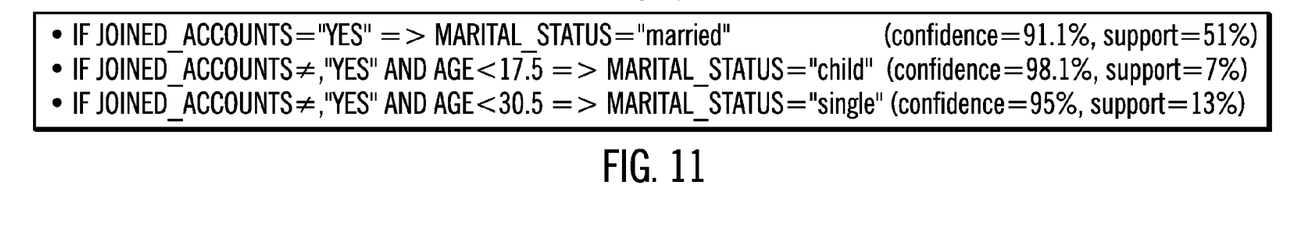
FIG. 11 illustrates an example of data rules generated from a tree classification algorithm.

FIG. 11 provides an example of the data rules the data mining engine 15 generates for the MARITAL_STATUS column using the sample data shown in the tree classification in FIG. 9. FIG. 11 shows the data rules generated with support=2% and confidence=90%. The table represents the decision path. Each row in the table represents a node with a confidence >90% and a support (node size) >2%, including the IF condition that was generated by walking the decision path for the node and the node's confidence and score. Computing data rules from tree classification models may require more computation than the association rules approach, because one model has to be computed for each column for the tree classification, instead of one single model computed for the whole table in the association rules approach. However, the tree classification approach may increase the quality and precision of the generated rules. For example, the tree classification algorithm may produce the rule: if (age <18) then (marital_status="child"), while the association rule may produce the separate rules: if (age between 0 and 10) then (marital_status="child") and if (age between 10 and 20) then (marital_status="child").

With the described embodiments, a rule discovery program may automatically generate data rules based on a data set of records that may be used to evaluate data records to determine records that deviate from the rules. User input may be provided to determine the data mining algorithms and confidence and support levels to use to generate data rules. Further, the user may modify or delete generated data rules by analyzing the rules and by analyzing deviant records that did not satisfy the data rule conditions. These automatically generated rules may then be used to evaluate subsequently selected sets of data records.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 2, 3, and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
   applying a first data mining algorithm in the computer to a data set including multiple records to generate a first set of data rules for the data set, wherein each record in the data set has a record format including a plurality of fields;
   applying a second data mining algorithm in the computer to the data set to generate a second set of data rules, wherein each rule in the first and second sets of data rules provides a predicted condition for one field based on at least one predictor condition in at least one other field, wherein the first and second data mining algorithms comprise different algorithms that generate rules using different algorithms and generate different types of models to build the sets of data rules;
   providing the generated first and second sets of data rules to a user interface presented by the computer;
   receiving user input via the user interface to review and edit the generated at least one of the first and second sets of data rules; and
   storing the reviewed and edited data rules in a rule repository for use to validate data sets having the record format.

2. The method of claim 1, further comprising:
   applying the generated at least one of the first and second sets of data rules to a data set to identify records that do not satisfy the rules; and
   presenting the identified records to the user interface for the user to review when editing the generated at least one of the first and second sets of data rules.

3. The method of claim 1, further comprising:
   receiving from the user interface user modifications to the generated at least one of the first and second sets of data rules; and
   generating a user approved set of data rules including the user modifications to the generated at least one of the first and second sets of data rules, wherein the user approved set of data rules is stored in the rule repository.

4. The method of claim 1, wherein the first and second data mining algorithms comprise a data mining technique that is a member of the set of data mining techniques including association rules and tree classifications.

5. The method of claim 1, further comprising:
   identifying rules in the first and second sets of data rules that are redundant;
   presenting in the user interface information to the user indicating redundant data rules; and
   receiving user input via the user interface to modify the at least one of the first and second sets of data rules to remove redundant data rules.

6. The method of claim 1, wherein the first data mining algorithm uses association rules to determine the data rules and wherein the second data mining algorithm uses a tree classification data mining algorithm.

7. The method of claim 1 wherein the first and second sets of data rules provide rules in different rule language formats, further comprising:
   converting the first and second sets of data rules to a common rule language format to store in the repository.

8. The method of claim 1, wherein the at least one of the first and second sets of data rules provided to the user interface and stored in the repository satisfy a defined confidence level indicating a minimum probability at which at least one predictor condition for the at least one field infers the predicted condition for one field.

9. The method of claim 8, wherein the at least one of the first and second sets of data rules provided to the user interface and stored in the repository satisfy at least one of a minimum support level, minimum confidence level, minimum lift level, and maximum rule length and are entered via the user interface.

10. The method of claim 1, further comprising:
    discretizing numerical fields to convert the numerical fields to ranges of values, wherein the at least one of the first and second sets of data rules are generated from the discretized numerical fields.

11. The method of claim 1, wherein the data set has multiple columns, wherein generating the at least one of the first and second sets of data rules comprises:
    generating a tree classification model for each column comprising nodes, wherein each node provides predictive conditions that produce a predicted condition in the column; and
    determining, for each tree classification model, nodes inferring data rules comprising predicative and predicted conditions that satisfy support and confidence levels.

12. A system, comprising:
    a processor;
    a computer readable storage medium including program components executed by the processor, comprising:
        a user interface;
        a rule repository; and
        a rule engine executed to cause operations to be performed, the operations comprising:
            invoking a first data mining engine to process a data set including multiple records to generate a first set of data rules for the data set, wherein each record in the data set has a record format including a plurality of fields;
            invoking a second data mining engine to generate a second set of data rules, wherein each rule in the first and second sets of data rules provides a predicted condition for one field based on at least one predictor condition in at least one other field, wherein the first and second data mining algorithms comprise different algorithms that generate rules using different algorithms and generate different types of models to build the sets of data rules;

providing the generated first and second sets of data rules to the user interface;

receiving user input via the user interface to review and edit the generated at least one of the first and second sets of data rules; and storing the reviewed and edited data rules in the rule repository for use to validate data sets having the record format.

13. The system of claim 12, wherein the operations caused by the rule engine further comprise:

applying the generated at least one of the first and second sets of data rules to a data set to identify records that do not satisfy the rules; and presenting the identified records to the user interface for the user to review when editing the generated at least one of the first and second sets of data rules.

14. The system of claim 12, further comprising:

a rule editor user interface to receive user modifications to the generated at least one of the first and second sets of data rules and generate a user approved set of data rules including the user modifications to the generated at least one of the first and second sets of data rules, wherein the user approved set of data rules is stored in the rule repository.

15. The system of claim 12, wherein the first and second data mining algorithms comprise a data mining technique that is a member of the set of data mining techniques including association rules and tree classifications.

16. The system of claim 12, wherein the operations caused by the rule engine further comprises:

identifying rules in the first and second sets of data rules that are redundant;

presenting in the user interface information to the user indicating redundant data rules; and receiving user input via the user interface to modify the at least one of the first and second sets of data rules to remove redundant data rules.

17. The system of claim 12, wherein the first data mining algorithm uses association rules to determine the data rules and wherein the second data mining algorithm uses a tree classification data mining algorithm.

18. The system of claim 12, wherein the first and second sets of data rules provide rules in different rule language formats, wherein the operations caused by the rule engine further comprises:

converting the first and second sets of data rules to a common rule language format to store in the repository.

19. The system of claim 12, wherein the at least one of the first and second sets of data rules provided to the user interface and stored in the repository satisfy a defined confidence level indicating a minimum probability at which at least one predictor condition for the at least one field infers the predicted condition for one field.

20. The system of claim 19, wherein the at least one of the first and second sets of data rules provided to the user interface and stored in the repository satisfy at least one of a minimum support level, minimum confidence level, minimum lift level, and maximum rule length and are entered via the user interface.

21. The system of claim 12, wherein further comprising:

discretizing numerical fields to convert the numerical fields to ranges of values, wherein the at least one of the first and second sets of data rules are generated from the discretized numerical fields.

22. The system of claim 12, wherein the data set has multiple columns, wherein generating the at least one of the first and second sets of data rules comprises:

generating a tree classification model for each column comprising nodes, wherein each node provides predictive conditions that produce a predicted condition in the column; and determining, for each tree classification model, nodes inferring data rules comprising predicative and predicted conditions that satisfy support and confidence levels.

23. An article of manufacture comprising a computer readable storage medium including code executed to communicate with a rule repository and user interface and to cause operations, the operations comprising:

applying a first data mining algorithm to a data set including multiple records to generate a first set of data rules for the data set, wherein each record in the data set has a record format including a plurality of fields;

applying a second data mining algorithm to the data set to generate a second set of data rules, wherein each rule in the first and second sets of data rules provides a predicted condition for one field based on at least one predictor condition in at least one other field, wherein the first and second data mining algorithms comprise different algorithms that generate rules using different algorithms and generate different types of models to build the sets of data rules;

providing the generated first and second sets of data rules to the user interface;

receiving user input via the user interface to review and edit the generated at least one of the first and second sets of data rules; and storing the reviewed and edited data rules in the rule repository for use to validate data sets having the record format.

24. The article of manufacture of claim 23, wherein the operations further comprise:

applying the generated data rules to a data set to identify records that do not satisfy the rules; and presenting the identified records to the user interface for the user to review when editing the generated at least one of the first and second sets of data rules.

25. The article of manufacture of claim 23, wherein the operations further comprise:

receiving from the user interface user modifications to the generated at least one of the first and second sets of data rules; and generating a user approved set of data rules including the user modifications to the generated at least one of the first and second sets of data rules, wherein the user approved set of data rules is stored in the rule repository.

26. The article of manufacture of claim 23, wherein the first and second data mining algorithms comprise a data mining technique that is a member of the set of data mining techniques including association rules and tree classifications.

27. The article of manufacture of claim 23, wherein the operations further comprise:

identifying rules in the first and second sets of data rules that are redundant;

presenting in the user interface information to the user indicating redundant data rules; and receiving user input via the user interface to modify the at least one of the first and second sets of rules to remove redundant data rules.

28. The article of manufacture of claim 23, wherein the first data mining algorithm uses association rules to determine the data rules and wherein the second data mining algorithm uses a tree classification data mining algorithm.

29. The article of manufacture of claim 23, wherein the first and second sets of data rules provide rules in different rule language formats, wherein the operations further comprise:
converting the first and second sets of data rules to a common rule language format to store in the repository.

30. The article of manufacture of claim 23, wherein the at least one of the first and second sets of data rules provided to the user interface and stored in the repository satisfy a defined confidence level indicating a minimum probability at which at least one predictor condition for the at least one field infers the predicted condition for one field.

31. The article of manufacture of claim 30, wherein the at least one of the first and second sets of data rules provided to the user interface and stored in the repository satisfy at least one of a minimum support level, minimum confidence level, minimum lift level, and maximum rule length and are entered via the user interface.

32. The article of manufacture of claim 23, further comprising:
discretizing numerical fields to convert the numerical fields to ranges of values, wherein the at least one of the first and second sets of data rules are generated from the discretized numerical fields.

33. The article of manufacture of claim 23, wherein the data set has multiple columns, wherein generating the at least one of the first and second sets of data rules comprises:
generating a tree classification model for each column comprising nodes, wherein each node provides predictive conditions that produce a predicted condition in the column; and
determining, for each tree classification model, nodes inferring data rules comprising predicative and predicted conditions that satisfy support and confidence levels.

\* \* \* \* \*